(12) United States Patent
Lin

(10) Patent No.: US 7,634,609 B2
(45) Date of Patent: Dec. 15, 2009

(54) DATA TRANSMISSION COORDINATING METHOD

(75) Inventor: Ruei-Ling Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 11/876,542

(22) Filed: Oct. 22, 2007

(65) Prior Publication Data

US 2008/0040528 A1 Feb. 14, 2008

Related U.S. Application Data

(63) Continuation-in-part of application No. 11/239,173, filed on Sep. 29, 2005, now abandoned.

(51) Int. Cl.
*G06F 13/36* (2006.01)
*G06F 13/00* (2006.01)
*G06F 7/38* (2006.01)

(52) U.S. Cl. ............... 710/306; 710/300; 710/316; 712/229; 713/300; 713/323

(58) Field of Classification Search ............... 710/307
See application file for complete search history.

(56) References Cited

U.S. PATENT DOCUMENTS

| | | | |
|---|---|---|---|
| 6,003,103 A | 12/1999 | Klein | |
| 6,282,596 B1 | 8/2001 | Bealkowski et al. | |
| 6,519,670 B1 | 2/2003 | Meiyappan | |
| 6,557,065 B1 * | 4/2003 | Peleg et al. | 710/300 |
| 6,608,528 B2 | 8/2003 | Tam et al. | |
| 6,609,171 B1 | 8/2003 | Singh et al. | |
| 6,963,991 B2 * | 11/2005 | Hill et al. | 713/500 |
| 6,968,418 B2 | 11/2005 | Wollbrink et al. | |
| 6,970,962 B2 | 11/2005 | Dieffenderfer et al. | |
| 7,003,614 B2 | 2/2006 | Addy | |
| 7,073,082 B2 * | 7/2006 | Hsu | 713/323 |
| 7,096,303 B1 | 8/2006 | Caruk et al. | |
| 7,120,764 B2 | 10/2006 | Chuang et al. | |
| 7,124,269 B2 | 10/2006 | Chuang et al. | |
| 7,133,960 B1 | 11/2006 | Thompson et al. | |
| 7,480,587 B2 * | 1/2009 | Cancel | 702/132 |

(Continued)

OTHER PUBLICATIONS

Intel 840 Chipset: 82840 Memory Controller Hub (MCH), available at http://download.intel.com/design/chipsets/datashts/29802002.pdf. Sep. 2000—166 pages.*

(Continued)

*Primary Examiner*—Mark Rinehart
*Assistant Examiner*—Brian T Misiura
(74) *Attorney, Agent, or Firm*—Kirton & McConkie; Evan R. Witt

(57) ABSTRACT

In a data transmission coordinating method, the computer system enters a coordinating state, and a first signal is issued from the central processing unit to the data transmission standard storage unit of the bridge chip. In response to the first signal, a second signal is issued from the data transmission standard storage unit of the bridge chip to the central processing unit to inform the central processing unit of a first operable transmission standard of the bridge chip. After the computer system exits the coordinating state, data transmission between the central processing unit and the bridge chip is performed according to the first operable transmission standard in a first condition.

19 Claims, 13 Drawing Sheets

U.S. PATENT DOCUMENTS

| | | |
|---|---|---|
| 7,480,808 B2 * | 1/2009 | Caruk et al. ............... 713/300 |
| 2004/0225821 A1 | 11/2004 | Klein et al. |
| 2005/0093524 A1 | 5/2005 | Hsu |
| 2006/0095632 A1 | 5/2006 | Lin |
| 2006/0095633 A1 | 5/2006 | Lin et al. |
| 2006/0164328 A1 | 7/2006 | Jaff |
| 2006/0282600 A1 * | 12/2006 | Wang ....................... 710/306 |
| 2008/0263254 A1 * | 10/2008 | Su et al. .................... 710/310 |

OTHER PUBLICATIONS

Intel 845 Chipset: 82845 Memory Controller Hub (MCH) for DDR, available at http://download.intel.com/design/chipsets/datashts/29860401.pdf. Jan. 2002—148 pages.*

* cited by examiner

| Input | | Output |
|---|---|---|
| A | RST | Gate |
| 0 | 0 | 1 |
| 0 | 1 | 0 |
| 1 | 0 | 0 |
| 1 | 1 | 0 |

US 7,634,609 B2

DATA TRANSMISSION COORDINATING METHOD

CROSS REFERENCE TO RELATED PATENT APPLICATION

This patent application is a continuation-in-part (CIP) application of a U.S. patent application Ser. No. 11/239,173 filed Sep. 29, 2005 and now pending. The contents of the related patent application are incorporated herein for reference.

FIELD OF THE INVENTION

The present invention relates to a data transmission coordinating method, and more particularly to a data transmission coordinating method for coordinating transmission width between a central processing unit and a bridge chip of a computer system.

BACKGROUND OF THE INVENTION

A motherboard of a computer system is generally provided with a central processing unit (CPU), a chipset and some peripheral circuits. The CPU is the core component of a computer system for processing and controlling operations and cooperation of all the other components in the computer system. The chipset may be in various forms but generally includes a north bridge chip and a south bridge chip, which are used to control communication between the CPU and the peripheral circuits. In general, the north bridge chip serves for the communication with the high-speed buses while the south bridge chip serves for the communication with low-speed devices in the system.

FIG. 1A is a schematic functional block diagram illustrating some devices disposed on or coupled to a motherboard 1 in a single CPU computer system. On the motherboard 1, a chipset 2 including a north bridge chip 20 and a south bridge chip 21 is electrically connected to the CPU 10 via a front side bus (FSB) 22. On the motherboard 1, an accelerated graphics port (AGP) interface 31 and a random access memory (RAM) 32 are electrically connected to the north bridge chip 20 via an AGP bus 311 and a memory bus 321, respectively. A peripheral component interconnect (PCI) interface 30 is electrically connected to the south bridge chip 21 via a PCI bus 301. In addition, an industry standard architecture (ISA) interface 40, an integrated device electronics (IDE) interface 41, a universal serial bus (USB) interface, an external keyboard device 43 and an external mouse device 44, which operate at a low speed, are electrically connected to the south bridge chip 21.

In the above architecture, the standard of the FSB 22 should support both the north bridge chip 20 and the CPU 10 coupled thereto, as illustrated in FIG. 1B. If the transmission standard of the north bridge chip 20 via the FSB 22 mismatched that of the CPU 10, e.g. different in width (bits) or bit speed (MHz), the communication between the north bridge chip 20 and the CPU 10 would fail or some of transmitted data might be lost. For example, a bridge chip adapted to a processor with a 64-bit front-side-bus width will be unsuited to another processor with a 32-bit front-side-bus width. Otherwise, a half of the transmitted data will not be received. In other words, the compatibility between the CPU and the bridge chip is critical to data transmission.

Some possible combinations of front-side-bus width of the CPU and the north bridge chip are exemplified with reference to FIGS. 2A~2D. The front side bus (FSB) includes an address bus and a data bus respectively for address and data transmission between the CPU and the north bridge chip. In the example of FIG. 2A, the CPU 101 and the north bridge chip 201 have the same FSB width, e.g. both 32 bits for address transmission and both 64 bits for data transmission. Since the transmission standards of the CPU 101 and the north bridge chip 201 are compatible with each other, the system can operate normally. Likewise, in the example of FIG. 2B, the CPU 102 and the north bridge chip 202 have the same FSB width, e.g. both 13 bits for address transmission and both 32 bits for data transmission. Since the transmission standards of the CPU 102 and the north bridge chip 202 are compatible with each other, the system can also operate normally. In the example of FIG. 2C, on the other hand, while the CPU 102 has 13-bit width for address transmission and 32-bit width for data transmission, the north bridge chip 201 has 32-bit width for address transmission and 64-bit width for data transmission. Since the transmission standards of the CPU 102 and the north bridge chip 201 are not consistent, the communication between the CPU 102 and the north bridge chip 201 cannot be normally performed. A similar idle situation is illustrated in FIG. 2D, where the CPU 101 allowing 32-bit width for address transmission and 64-bit width for data transmission is inconsistent with the north bridge chip 201 allowing 13-bit width for address transmission and 32-bit width for data transmission. In addition to FSB width, incompatible transmission speeds between the CPU and bridge chip will also adversely affect the operation of the computer system.

With increasing tendency to compactness of devices, portable electronic apparatus such as personal digital assistants (PDAs) or notebook computers require smaller motherboards or chips with lower pin numbers compared to a desktop computer that needs to support various applications. Accordingly, CPUs with different transmission standards for optional requirement of performance or compactness and bridge chips with different transmission standards for conforming to the transmission standards of the corresponding CPUs need be manufactured and stocked for selection to avoid the mismatching problems.

SUMMARY OF THE INVENTION

The present invention provides a data transmission coordinating method, which allows a CPU and a bridge chip with mismatching transmission standards to work together well.

The present invention provides a data transmission coordinating method for use between a central processing unit and a data transmission standard storage unit of a bridge chip. In the data transmission coordinating method, the computer system enters a coordinating state, and a first signal is issued from the central processing unit to the data transmission standard storage unit of the bridge chip. In response to the first signal, a second signal is issued from the data transmission standard storage unit of the bridge chip to the central processing unit to inform the central processing unit of a first operable transmission standard of the bridge chip. After the computer system exits the coordinating state, data transmission between the central processing unit and the bridge chip is performed according to the first operable transmission standard in a first condition.

The present invention also provides a data transmission coordinating method for use between a data transmission standard storage unit of a central processing unit and a bridge chip. In the data transmission coordinating method, the computer system enters a coordinating state, and a first signal is issued from the bridge chip to the data transmission standard storage unit of the central processing unit. In response to the first signal, a second signal is issued from the data transmission standard storage unit of the central processing unit to the bridge chip to inform the bridge chip of an operable transmission standard of the central processing unit. After the computer system exits the coordinating state, data transmission between the central processing unit and the bridge chip is performed with the operable transmission standard.

The present invention also provides a data transmission coordinating system. The data transmission coordinating system comprises a central processing unit, a bridge chip and a front side bus. The central processing unit issues a first signal after entering a coordinating state. The bridge chip includes a first data transmission standard storage unit that issues a second signal to inform the central processing unit of a first operable transmission standard of the bridge chip in response to the first signal. The front side bus conducts data transmission between the central processing unit and the bridge chip under a commonly operable transmission standard determined according to the first operable transmission standard.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

In order to enable the CPU and bridge chip with possibly inconsistent transmission standards to communicate with each other, a data transmission coordinating method according to the present invention is performed in advance to coordinate a commonly operable transmission standard for both the central processing unit and the bridge chip of a computer system. An embodiment of the data transmission coordinating method will be illustrated herein with reference to FIG. 3.

Figure 1A:
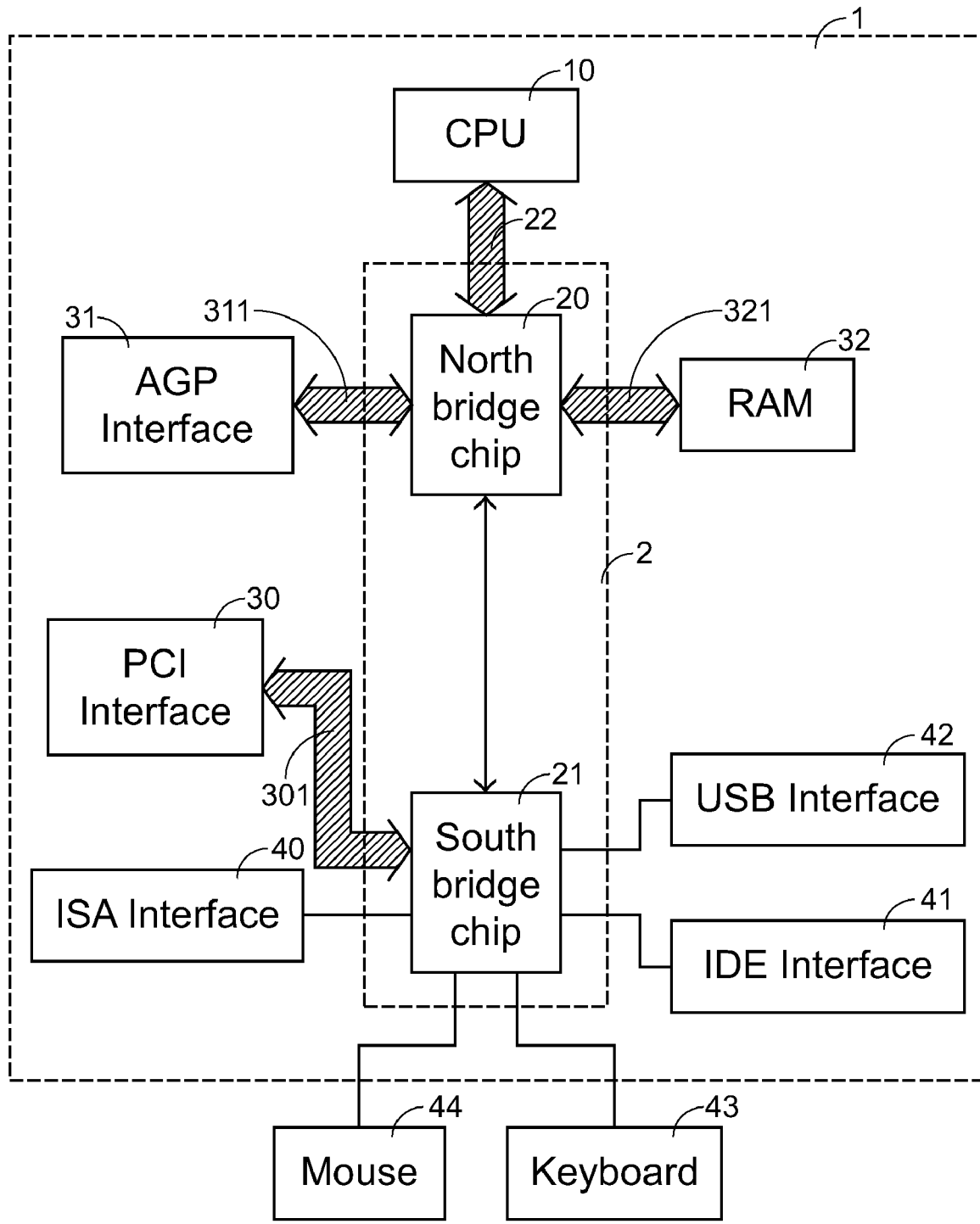
FIG. 1A is a schematic circuit block diagram of a computer system.
Figure 1B:
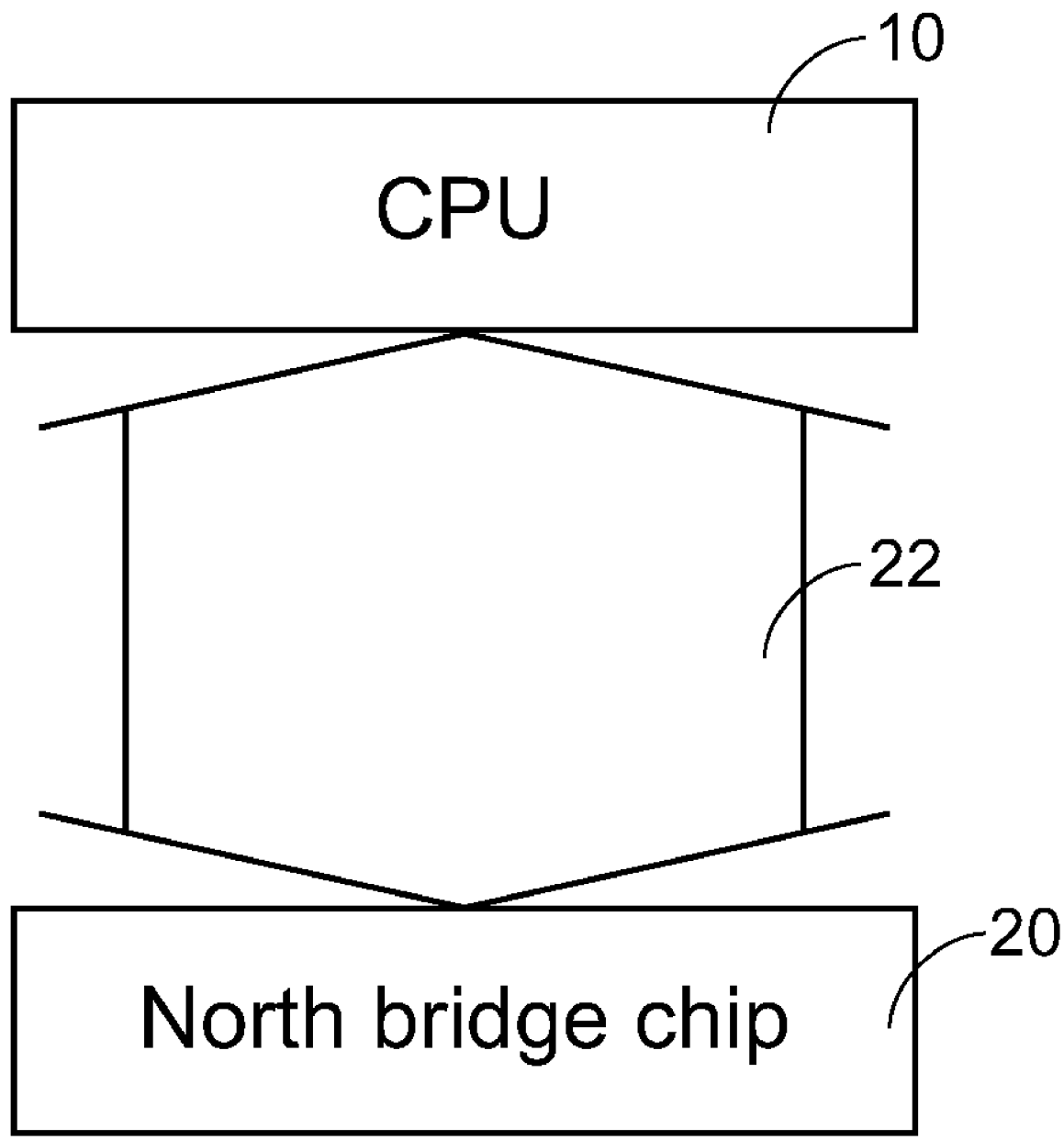
FIG. 1B is a schematic diagram illustrating the data transmission between the CPU and the north bridge chip via the front side bus.
Figure 2A:
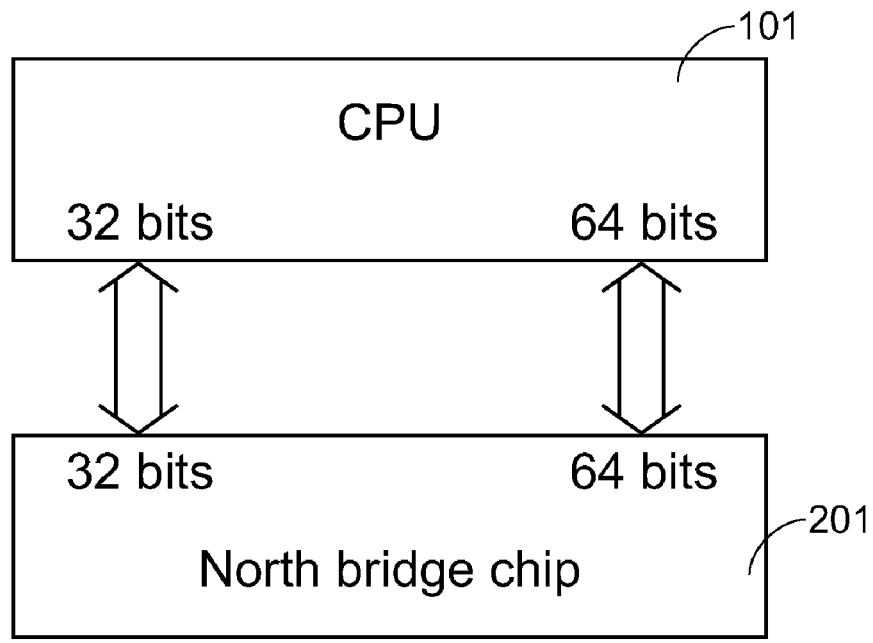
FIGS. 2A~2D are schematic diagrams illustrating four exemplified combinations of bus transmission widths of CPU and north bridge chip.
Figure 2B:
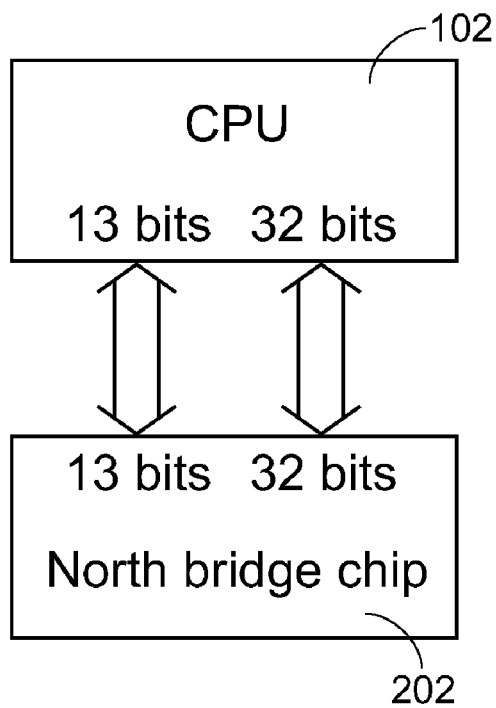
Figure 2C:
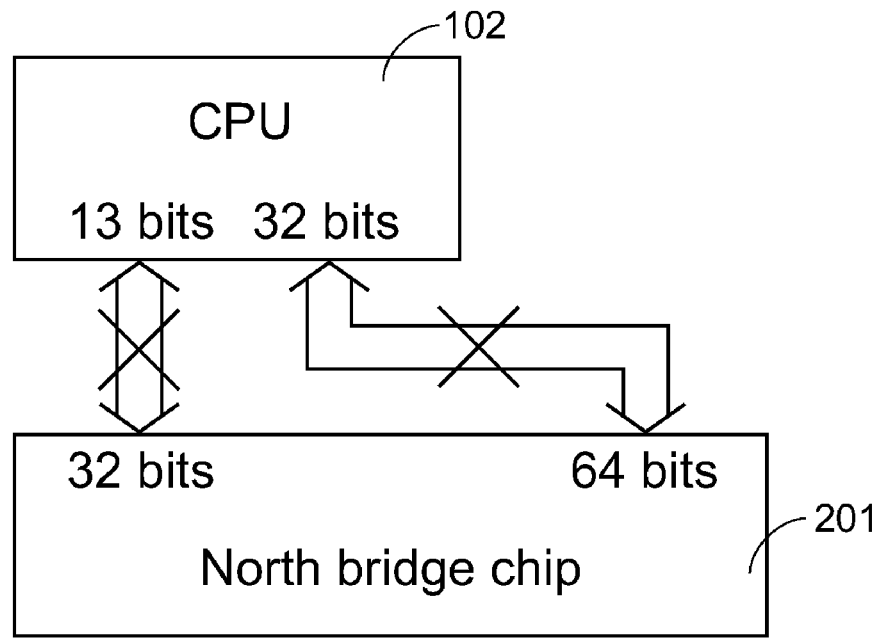
Figure 2D:
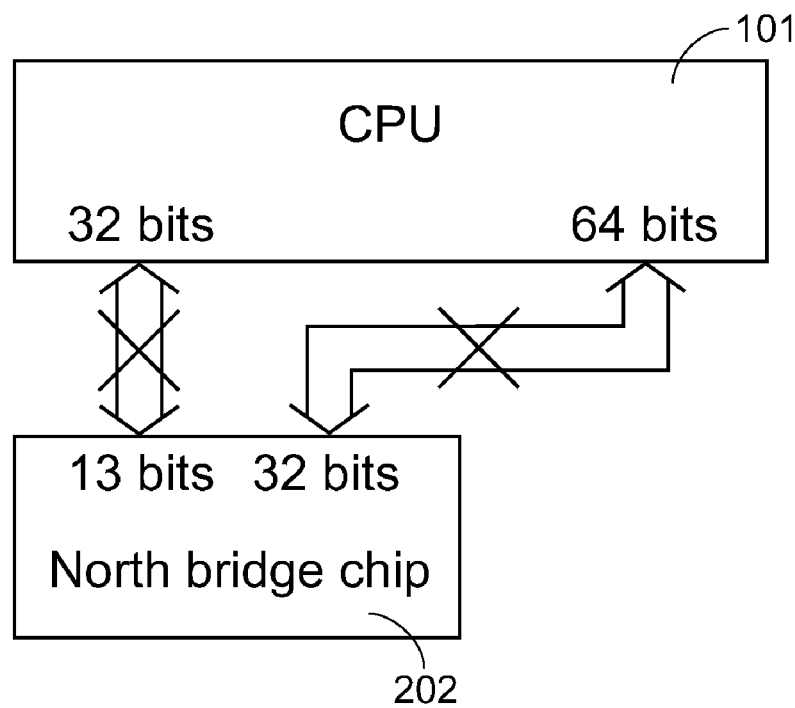
Figure 3:
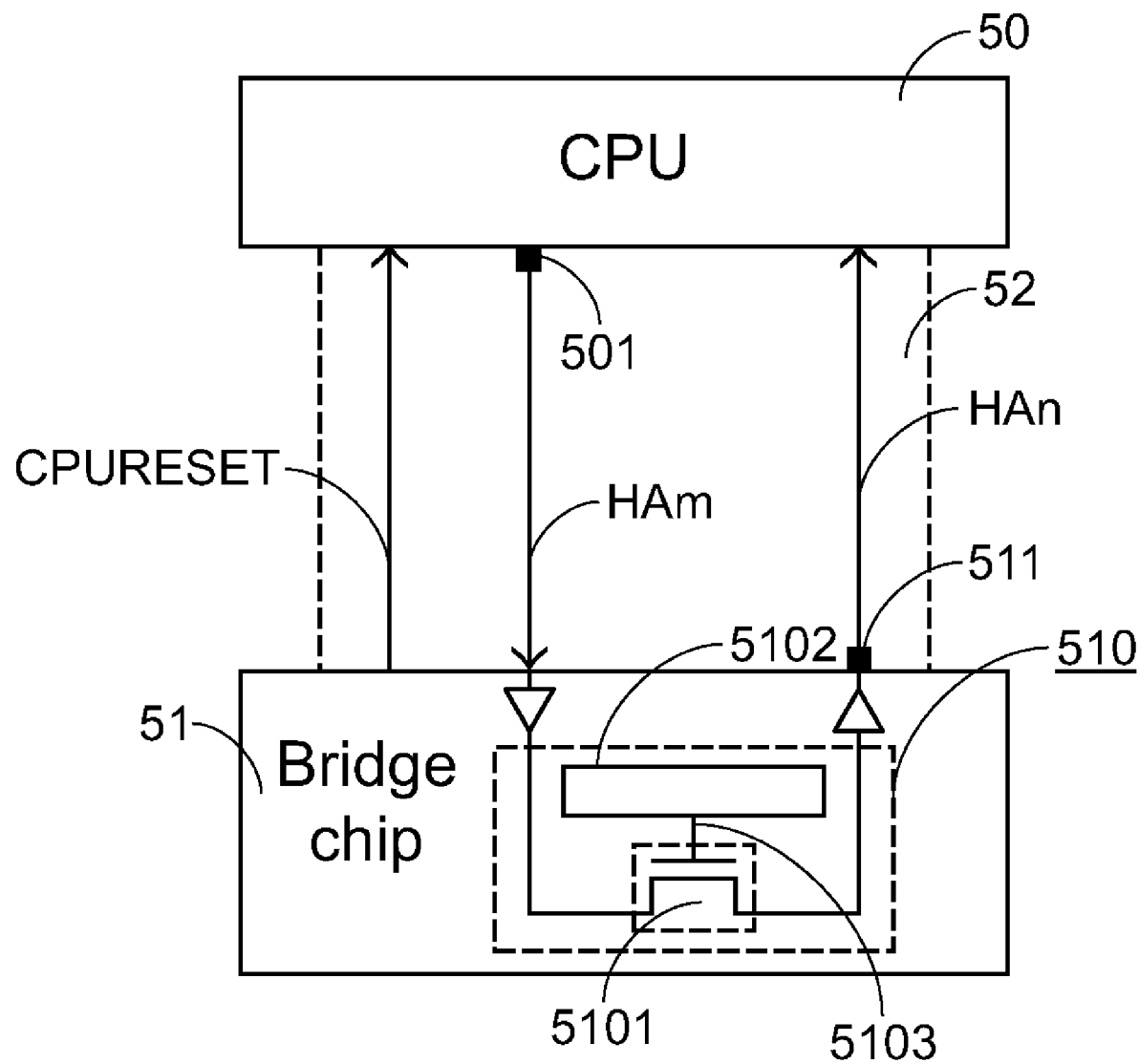
FIG. 3 is a schematic diagram illustrating a data transmission coordinating method according to an embodiment of the present invention, wherein a data transmission standard storage unit is included in the bridge chip.

In a computer system of FIG. 3, a CPU 50 communicates with a bridge chip 51, e.g. a north bridge chip, via a bus 52, e.g. a front side bus. For coordinating the commonly operable transmission standard, the CPU 50 issues a coordinating signal HAm from a pin 501 thereof, e.g. the mth bit, which is one of the pins in communication with a data transmission standard storage unit 510 of the bridge chip 51. In response to the coordinating signal HAm, the data transmission standard storage unit 510 of the bridge chip 51 issues another coordinating signal HAn from a pin 511 thereof, e.g. the nth bit, which is one of the pins in communication with the CPU 50. Via the coordinating signal HAn, the CPU 50 is informed of the transmission standard of the bridge chip. Since the CPU 50 realizes the transmission standard of the bridge chip 51, the data transmission between the CPU 50 and the bridge chip 51 can be performed with a commonly operable transmission standard.

Figure 7A:
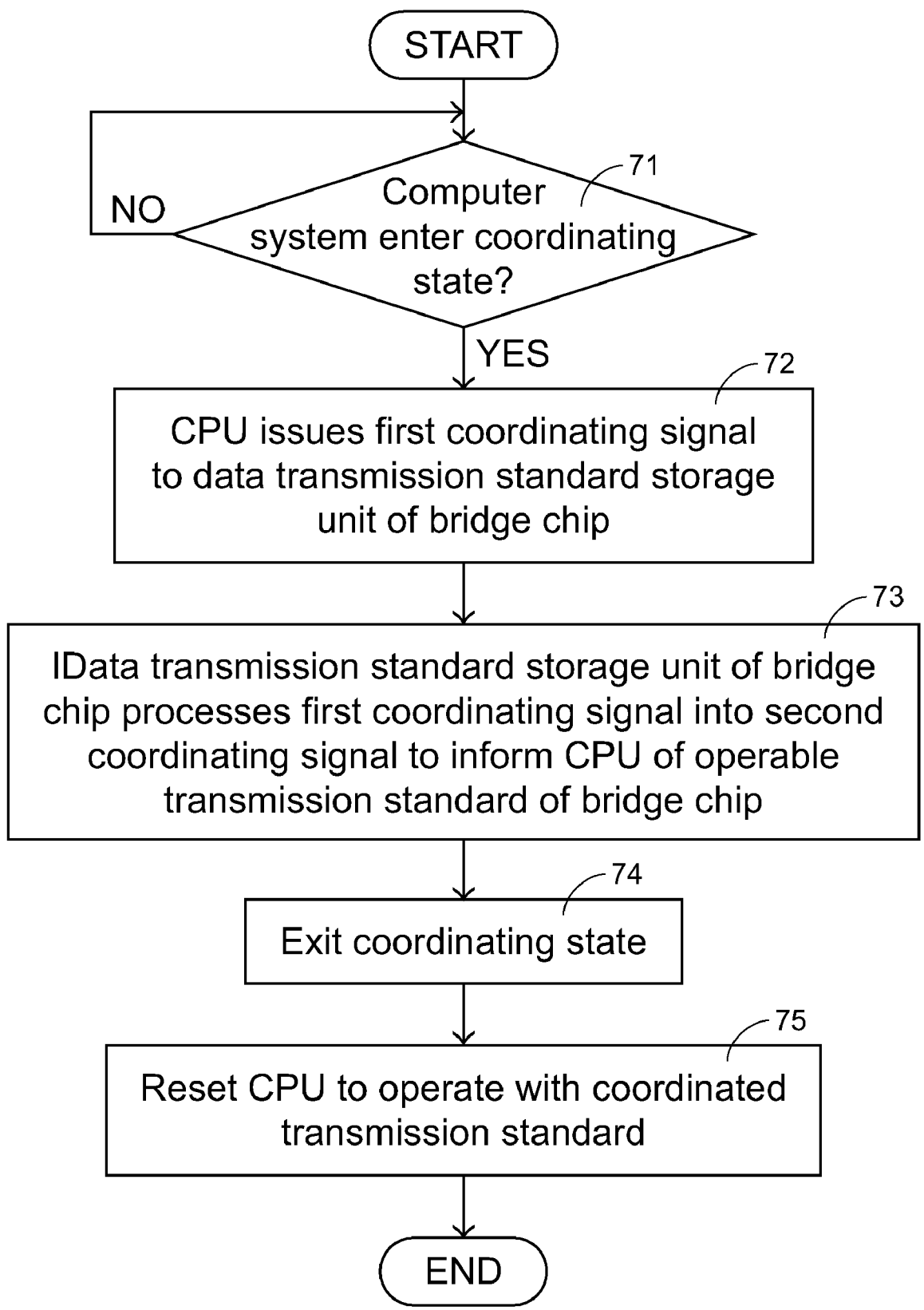
FIG. 7A is a flowchart illustrating a data transmission coordinating method according to an embodiment of the present invention.

A flowchart shown in FIG. 7(a) illustrates a data transmission coordinating method applicable to the system of FIG. 3. For starting the data transmission coordination, the computer system enters a coordinating state (Step 71). Then, the coordinating signal HAm is issued from the CPU to the data transmission standard storage unit of the bridge chip (Step 72). By processing the coordinating signal Ham, the coordinating signal HAn is obtained and outputted by the data transmission standard storage unit of the bridge chip to inform the CPU of an operable transmission standard of the bridge chip (Step 73). Then, the computer system exits the coordinating state (Step 74), and the subsequent data transmission between the CPU and bridge chip can be performed with current transmission standard. After the bridge chip issues a CPU reset signal CPURESET to reset the CPU (Step 75). Accordingly, the CPU operates with the operable transmission standard for subsequent data transmission.

Figure 7B:
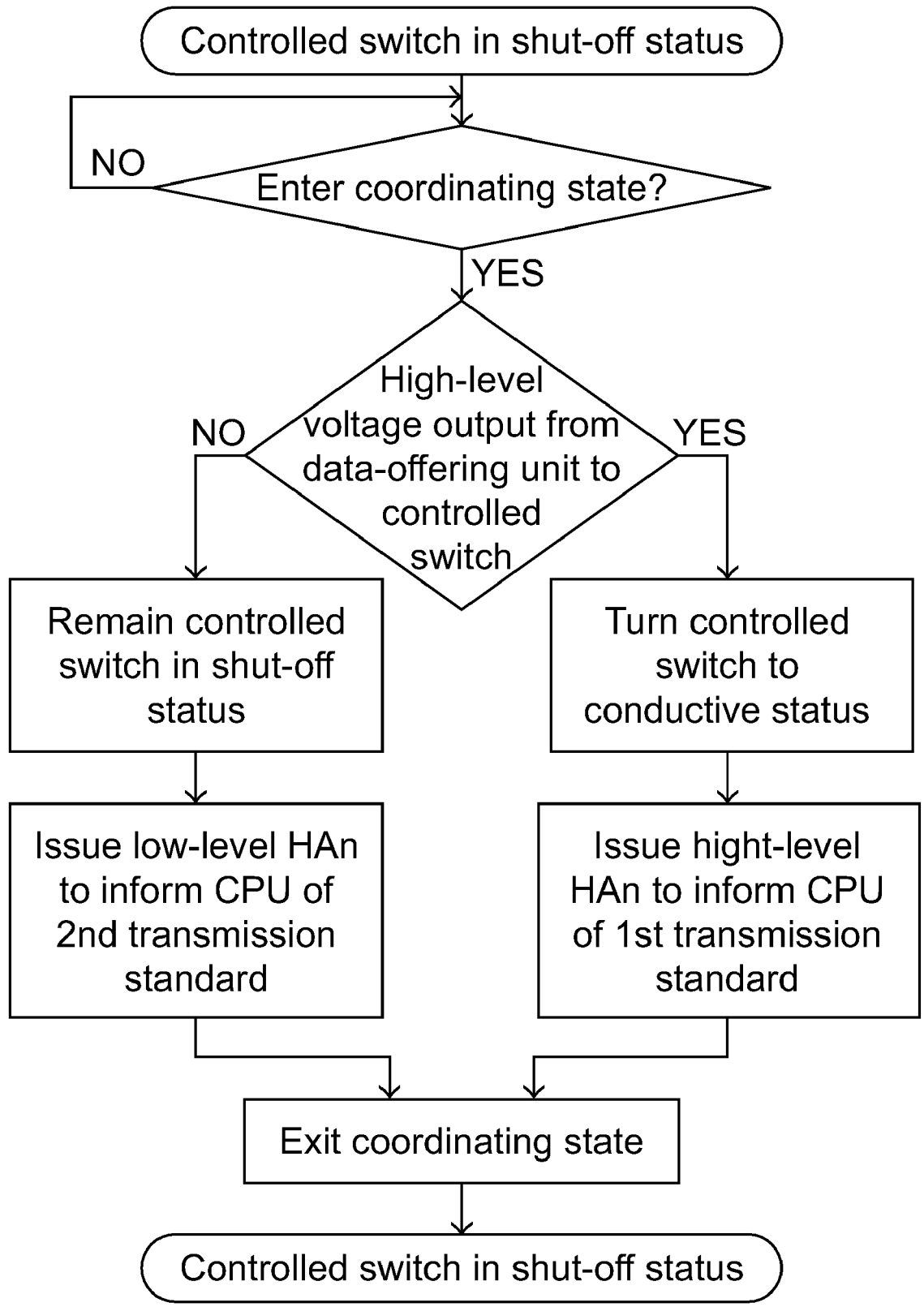
FIG. 7B is a flowchart illustrating a data transmission coordinating method according to the embodiment of FIG. 3.

How the coordinating signal HAm is processed into the coordinating signal Han and how the CPU 50 is informed of the transmission standard of the bridge chip by way of the coordinating signal HAn will be exemplified hereinafter with reference to FIG. 3 again. The data transmission standard storage unit 510 of the bridge chip 51 includes a controlled switch 5101 and a data-offering unit 5102. An exemplary controlled switch 5101 is a MOSFET transistor. One terminal of the controlled switch 5101 communicates with the pin 501 of the CPU 51 via the front side bus 52 to receive the coordinating signal HAm. The other terminal of the controlled switch 5101 is electrically connected to the pin 511 of the bridge chip 51 and thus communicates with the CPU 51 via the front side bus 52 to output the coordinating signal HAn. A control end 5103 of the controlled switch 5101 is coupled to the data-offering unit 5102. According to the logic output of the data-offering unit 5102, whether the controlled switch 5101 is either conducted or shut down is determined. For example, before the computer system enters a coordinating state, the controlled switch 5101 is kept in a shutdown status. Under this circumstance, the data transmission from the CPU 50 to the bridge chip 51 and the data transmission from the bridge chip 51 to the CPU 50 are independent of each other. After the computer system is reset to enter the coordinating state, the data-offering unit 5102 may output a high-level voltage to the controlled switch 5101 such that the controlled switch 5101 is situated in a conductive status or output a low-level voltage to remain the controlled switch 5101 in the shutdown status. The shutdown status and conductive status of the controlled switch 5101 result in low level and high level of the coordinating signal HAn, respectively, thereby informing the CPU of two different transmission standards of the bridge chip. The above operation associated with the bridge chip is summarized in FIG. 7B.

Figures 4A, 4B:
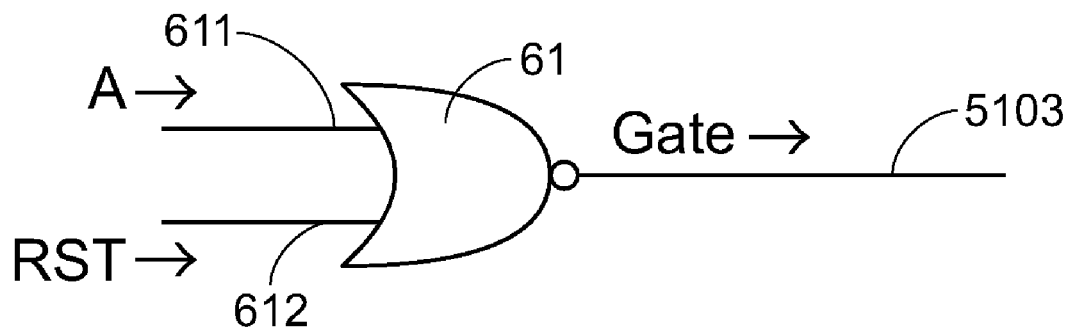
FIG. 4A is a schematic diagram of a NOR device for implementing the data-offering unit.
FIG. 4B is a true table of the NOR device shown in FIG. 4A.
Figure 4C:
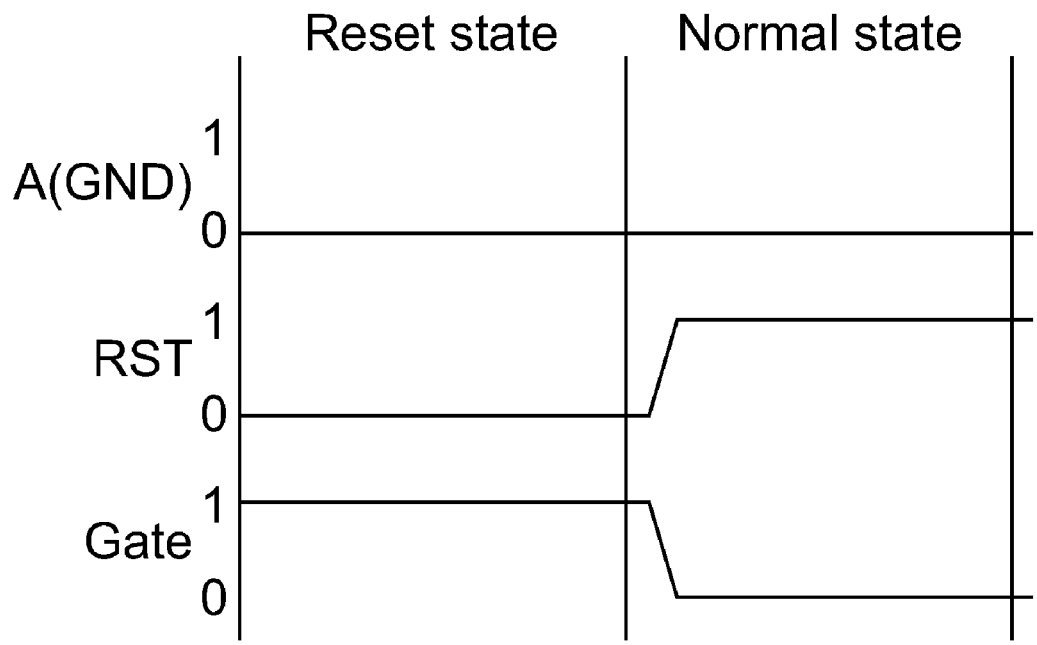
FIGS. 4C and 4D are time sequence plots illustrating associated signals of the NOR device of FIG. 4A for two different transmission standards of bridge chips, respectively.
Figure 4D:
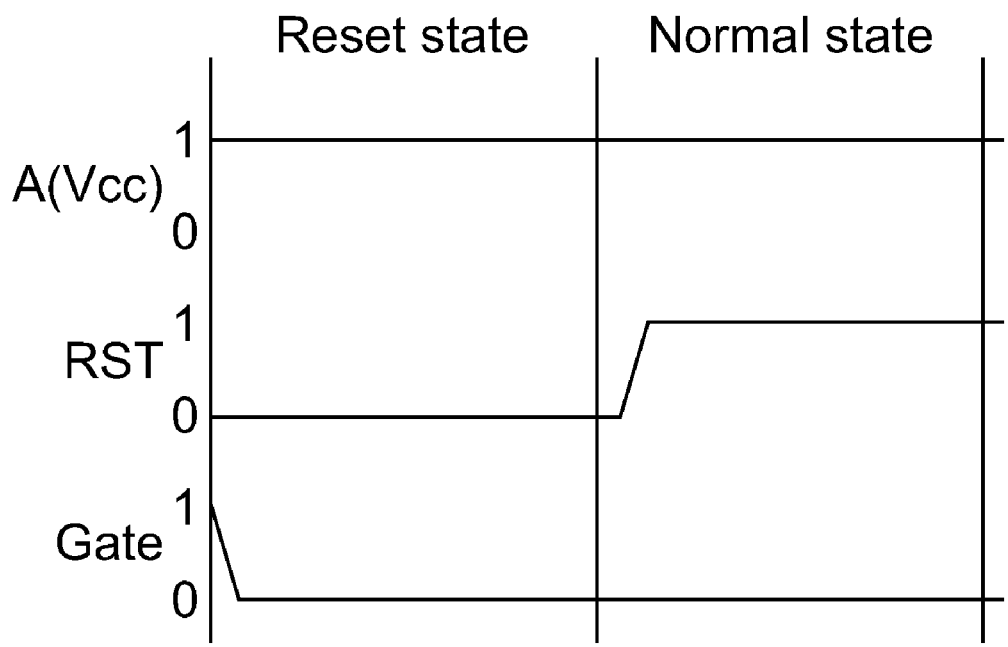

For achieving the above-mentioned purpose, the data-offering unit 5102 may be implemented with a NOR gate 61 as shown in FIG. 4A. The NOR gate 61 has input end 611 and input end 612 for inputting a voltage logic value A and a reset signal logic value RST, respectively, wherein the voltage logic value A represents the transmission standard of the bridge chip, and the reset signal logic value RST represents whether the coordinating state is entered. According to the voltage logic value A, the reset signal logic value RST and the true table of FIG. 4B, a status logic value gate, which represents the high/low level output of the data-offering unit 5102 for controlling the ON/OFF state of the controlled switch 5101, is outputted to the controlled switch 5101 via the control end 5103. Signal-issuing time sequences of the associated signals shown in FIGS. 4C~4D are used to illustrate how the NOR gate 61 works. In the example of FIG. 4C, the input 611 is grounded and thus the voltage logic value A is in "logic 0", which indicates the bridge chip operates at a high-bit transmission standard, e.g. 64-bit maximum bus transmission width. When the input end 612 is pulled low and thus the logic value RST is in "logic 0", the computer system is reset and enters the coordinating state. Then, the status logic value gate will be "logic 1", which means the controlled switch 1501 will be conducted. Whereas, in the case of FIG. 4D, the input end 611 is coupled to Vcc and thus the voltage logic value A is in "logic 1", which indicates the bridge chip operates at a low-bit transmission standard, e.g. 32-bit maximum bus transmission width. When the input end 612 is pulled low and thus the logic value RST is in "logic 0", the computer system is reset and enters the coordinating state. Then, the status logic value gate will be "logic 0", which means the controlled switch 1501 will remain shut-off. The conductive status of the controlled switch 1501 results in a logic high state of the signal HAn which successfully conveys the high-bit transmission standard of the bridge chip. On the other hand, the shutdown status of the controlled switch 1501 results in a logic low state of the signal HAn which successfully conveys the low-bit transmission standard of the bridge chip. After the coordinating procedure is accomplished, the logic value RST is switched from "logic 0" to "logic 1" to exit the coordinating state or enter the normal state. Accordingly, the status logic value gate becomes or remains "logic 0" to confirm the shutdown status of the controlled switch 1501. After resetting the CPU with the acquired information, the data transmission between the CPU and the bridge chip can be performed under the coordinated transmission standard indicated by the signal HAn.

In the above examples, the transmission standards are maximum bit numbers of bus transmission width. Depending on practical uses, it may also be maximum bit numbers of bus transmission speed per unit of time.

In the above examples, the output of the data transmission standard storage unit 510 is either "logic 0" or "logic 1", which represents two possible transmission standards of bridge chips, e.g. 32-bit maximum bus transmission width and 64-bit maximum bus transmission width. In this embodiment, it is preferred that the CPU is operable with a high-level transmission standard, e.g. 64-bit maximum bus transmission width, so as to support both the possible transmission standards of bridge chips. According to the transmission standard of bridge chip realized through the signal HAn, the CPU will operate with the commonly operable transmission standard for subsequent data transmission. Furthermore, by using bit combinations, more than 2 transmission standards of bridge chips can be distinguished. For example, the bits "00" indicate a small bus transmission width, the bits "01" indicate a medium bus transmission width, the bits "10" indicate a larger bus transmission width, and the bits "11" indicate the largest bus transmission width. These outputs can be obtained by logic circuitry modified according to the above embodiments.

Figure 5:
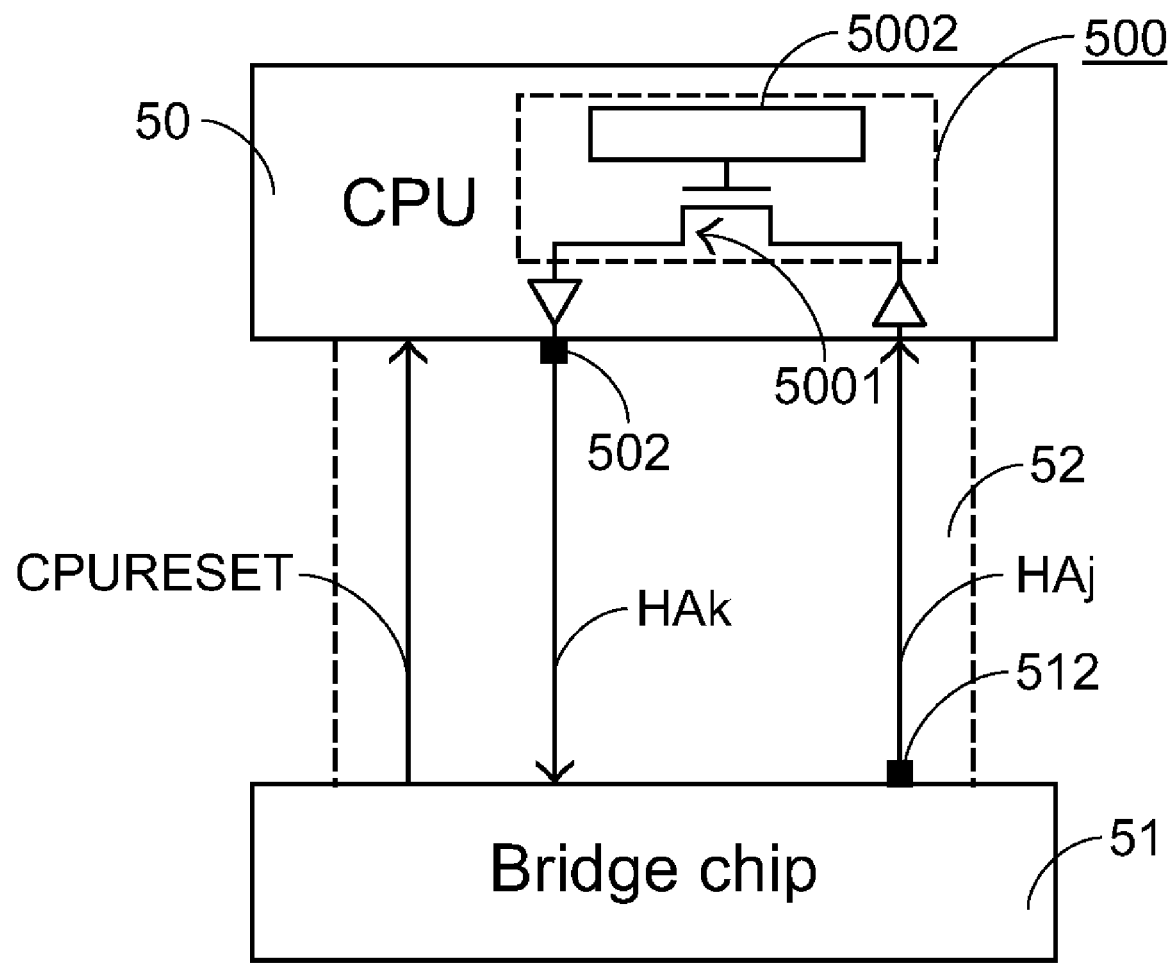
FIG. 5 is a schematic diagram illustrating a data transmission coordinating method according to another embodiment of the present invention, wherein a data transmission standard storage unit is included in the CPU.
Figure 8A:
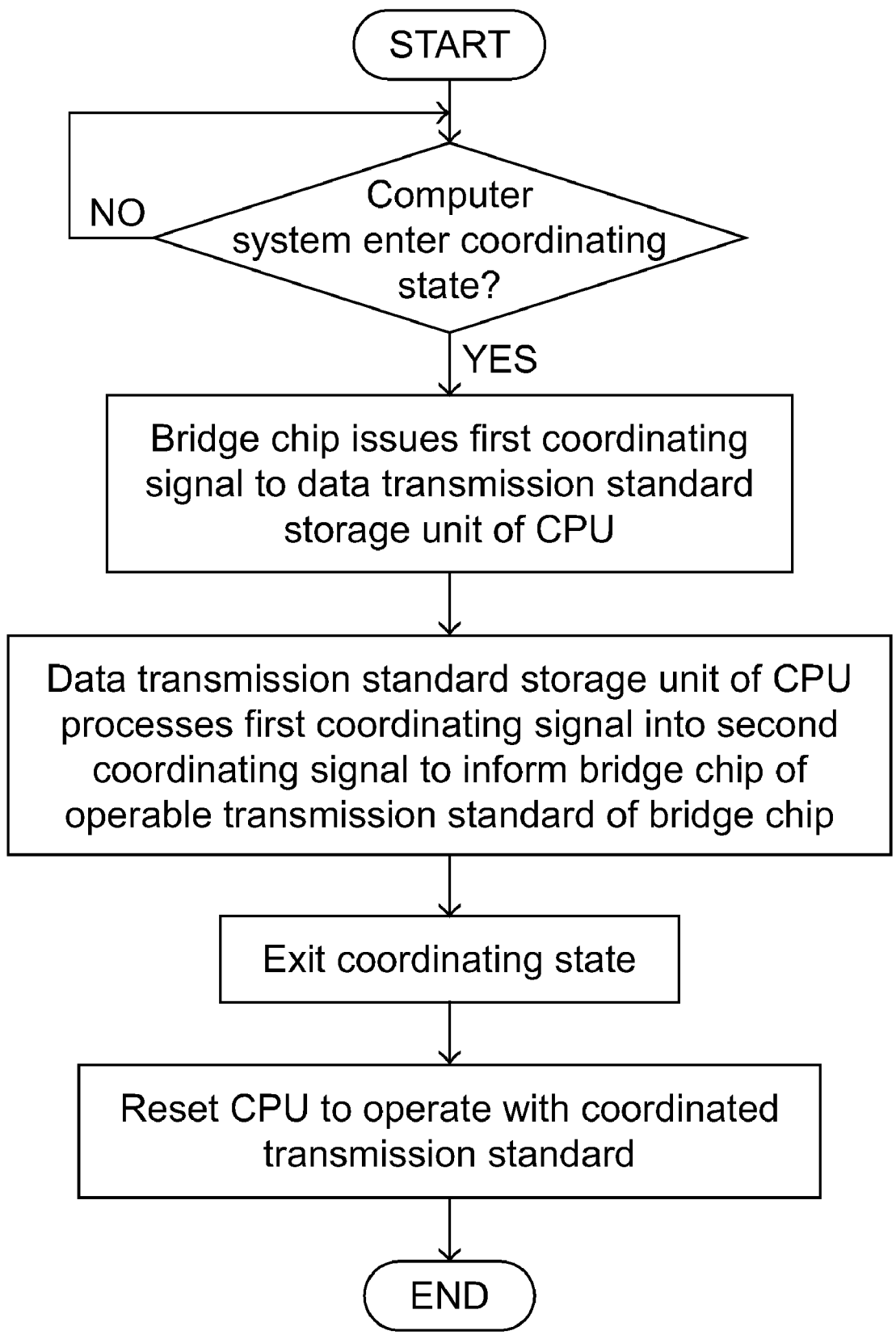
FIG. 8A is a flowchart illustrating a data transmission coordinating method according to another embodiment of the present invention.
Figure 8B:
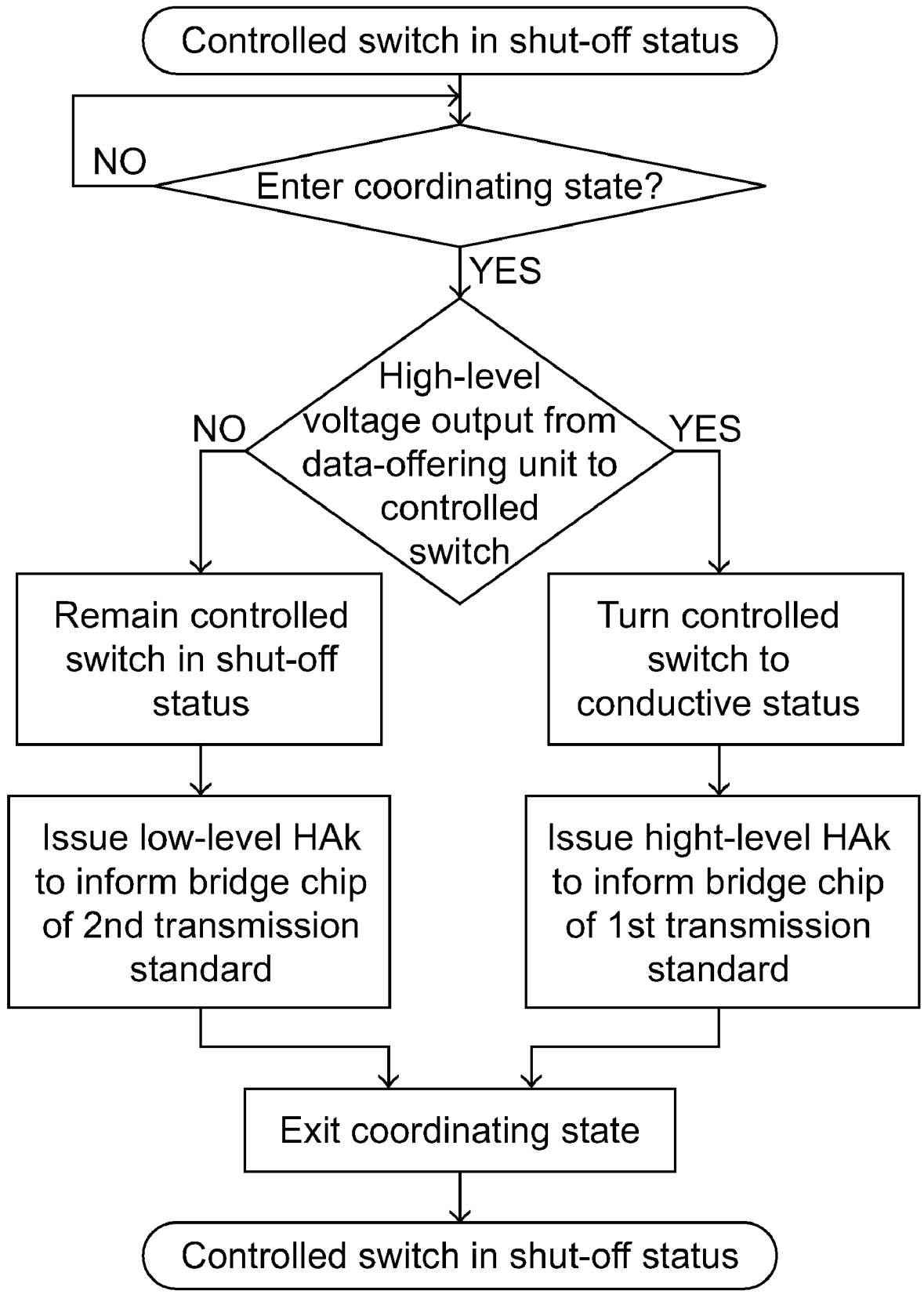
FIG. 8B is a flowchart illustrating a data transmission coordinating method according to the embodiment of FIG. 5.

Another embodiment of the data transmission coordinating method will be illustrated hereinafter with reference to FIG. 5. This embodiment is feasible on the condition that there are two possible transmission standards of CPUs available, e.g. 32-bit maximum bus transmission width and 64-bit maximum bus transmission width, and the bridge chip is operable with a high-level transmission standard capable of supporting both the possible transmission standards of CPUs, e.g. 64-bit maximum bus transmission width. The CPU 50 communicates with the bridge chip 51 via a bus front side bus 52. For coordinating the commonly operable transmission standard, the bridge chip 51 issues a coordinating signal HAj from a pin 501 thereof, which is one of the pins in communication with a data transmission standard storage unit 500 of the CPU 50. In response to the coordinating signal HAj, the data transmission standard storage unit 500 of the CPU 50 issues another coordinating signal HAk from a pin 511 thereof, which is one of the pins in communication with the bridge chip 51. Via the coordinating signal HAk, the bridge chip 51 is informed of the transmission standard of the CPU 50. Therefore, a commonly operable transmission standard can be coordinated. After resetting the CPU with the acquired information, the data transmission between the CPU and the bridge chip can be performed under the coordinated transmission standard indicated by the signal HAk. The data transmission standard storage unit 500 of the CPU 50, similar to the data transmission standard storage unit 510 of FIG. 3, includes a controlled switch 5001 and a data-offering unit 5002 implemented with a NOR gate and operates similar to the data transmission standard storage unit 510. The data transmission coordinating method as mentioned above and the operations associated with the CPU are summarized in the flowcharts of FIGS. 8A and 8B, respectively.

Figure 6:
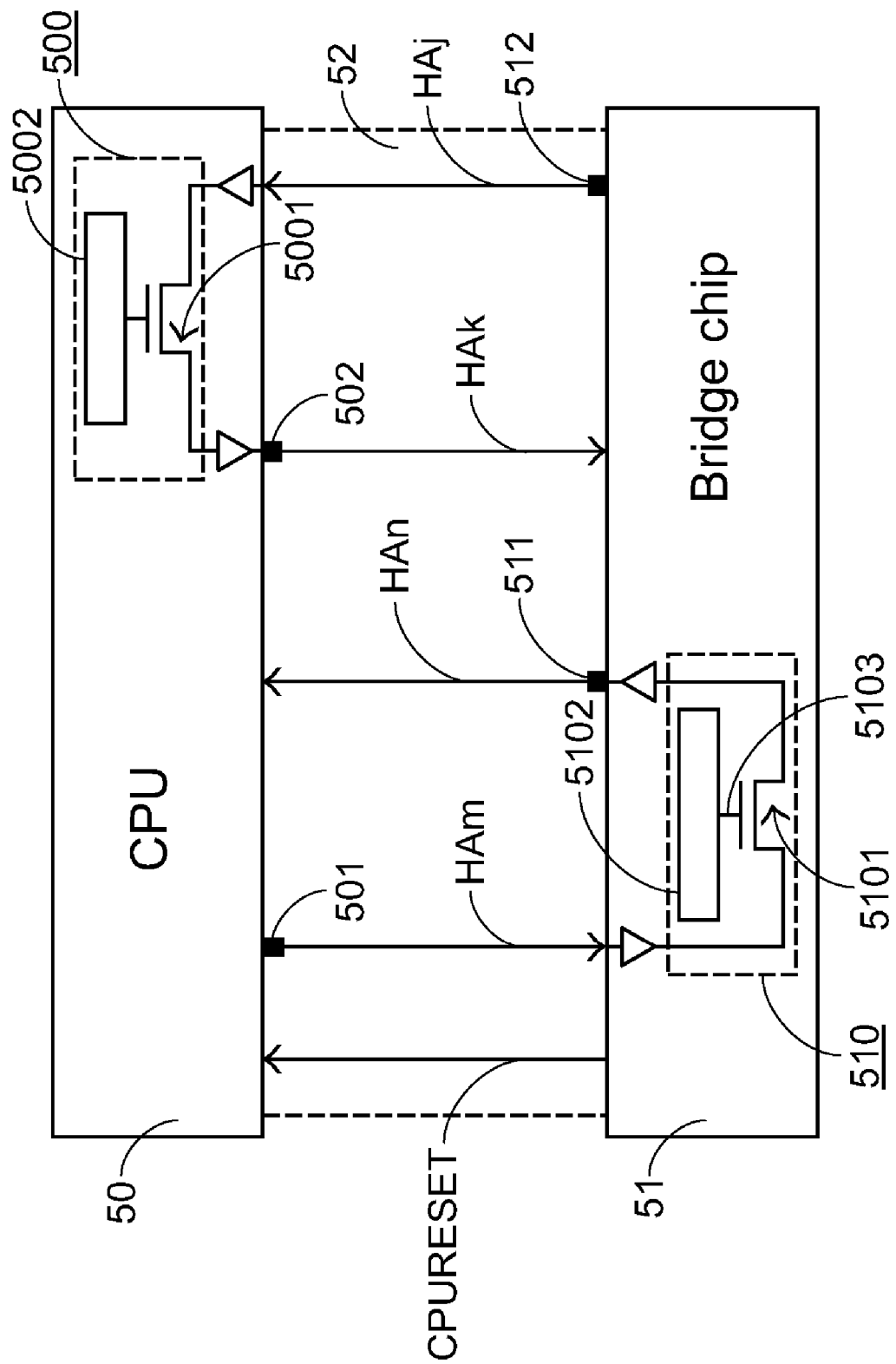
FIG. 6 is a schematic diagram illustrating a data transmission coordinating method according to a further embodiment of the present invention, wherein each of the bridge chip and the CPU includes a data transmission standard storage unit.

A further embodiment of the data transmission coordinating method according to the present invention is illustrated in FIG. 6. In this embodiment, there are two possible transmission standards of CPUs and two possible transmission standards of bridge chips, and each of the CPU 50 and the bridge chip 51 has therein a data transmission standard storage unit (500, 510). This embodiment has the advantage of reconfirmation so as to enhance the probability of successful transmission. As a high-level data transmission standard, e.g. 64-bit maximum bus transmission width, can support a low-level data transmission standard, e.g. 32-bit maximum bus transmission width, but the low-level one cannot support the high-level one, it is necessary in certain cases for the CPU and the bridge chip to realize the data transmission standards of each other. For example, in a case that the CPU has a 64-bit maximum bus transmission width but the bridge chip has a 32-bit maximum bus transmission width, the CPU 50 can realize the maximum bus transmission width of the bridge chip 51 via the data transmission standard storage unit 510 according to the coordinating method of FIG. 7A or 7B, and reset to operate with the consistent 32-bit maximum bus transmission width. However, in the case that the CPU 50 has a 32-bit maximum bus transmission width but the bridge chip 51 has a 64-bit maximum bus transmission width, it would be necessary for the bridge chip 51 to realize the maximum bus transmission width of the CPU 50 so that the data transmission between the CPU 50 and the bridge chip 51 can be performed successfully. This purpose can be achieved by using the data transmission standard storage unit 500 according to the coordinating method of FIG. 8A or 8B. Then, the CPU can be reset to have the data transmission between the CPU 50 and the bridge chip 51 performed with the consistent 32-bit maximum bus transmission width.

Likewise, in the above examples, the data transmission standards are maximum bit numbers of bus transmission width. Depending on practical uses, it may also be maximum bit numbers of bus transmission speed per unit of time.

From the above description, it is understood that by coordinating a commonly operable transmission standard for both the CPU and the bridge chip in advance and resetting the CPU to operate with the commonly operable transmission standard, the possible incompatibility problem between the CPU and the bridge chip can be solved so that the usage of the CPU and bridge chip becomes more flexible than ever.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data transmission coordinating method for communication between a central processing unit and a bridge chip in a computer system, comprising steps of:
   entering a coordinating state of the computer system;
   issuing a first signal by the central processing unit to a data transmission standard storage unit of the bridge chip, wherein the data transmission standard storage unit comprises a controlled switch communicating the bridge chip with the central processing unit, and a data-offering unit coupled to the controlled switch via a control end;
   processing the first signal into a second signal by the data transmission standard storage unit of the bridge chip and transmitting the second signal back to the central processing unit, wherein the second signal is differentiated by selectively conducting or shutting off the controlled switch in response to a control signal provided by the data-offering unit so as to inform the central processing unit of a first operable transmission standard of the bridge chip; and
   exiting the coordinating state of the computer system, and performing data transmission between the central processing unit and the bridge chip according to the first operable transmission standard in a first condition.

2. The method according to claim 1 further comprising steps of:
   issuing a third signal from the bridge chip to a data transmission standard storage unit of the central processing unit;
   issuing a fourth signal from the data transmission standard storage unit of the central processing unit to the bridge chip to inform the bridge chip of a second operable transmission standard of the central processing unit in response to the first signal; and
   exiting the coordinating state of the computer system, and performing data transmission between the central processing unit and the bridge chip according to the second operable transmission standard in a second condition.

3. The method according to claim 2 wherein the first condition is that the central processing unit is able to support the first operable transmission standard of the bridge chip, and the second condition is that the central processing unit is unable to support the first operable transmission standard of the bridge chip.

4. The method according to claim 1 further comprising a step of resetting the central processing unit after the computer system exits the coordinating state.

5. The method according to claim 1 wherein the computer system enters the coordinating state in response to a reset signal.

6. The method according to claim 1 wherein the first operable transmission standard to be coordinated is a maximum bit number of bus transmission width.

7. The method according to claim 1 wherein the first operable data transmission standard to be coordinated is a maximum bit number of bus transmission speed per unit of time.

8. The method according to claim 1 wherein the first signal is outputted by the central processing unit via a first pin communicating the central processing unit with the bridge chip.

9. The method according to claim 8 wherein the second signal is outputted by the bridge chip via a second pin communicating the bridge chip with the central processing unit.

10. The method according to claim 9 wherein the
    controlled switch has a first terminal in communication with the first pin for receiving the first signal, and having a second terminal coupled to the second pin for outputting the second signal.

11. The method according to claim 10 wherein the data-offering unit is a NOR gate outputting the control signal in a logic high state or a logic low state according to a first logic input representing the first operable transmission standard of the bridge chip, a second logic input indicating whether the coordinating state is entered or not, and a true table.

12. The method according to claim 10 wherein the controlled switch is preset in a shutdown status before the coordinating state is entered.

13. A data transmission coordinating method for communication between a central processing unit and a bridge chip in a computer system, comprising steps of:
    entering a coordinating state of the computer system;
    issuing a first signal by the bridge chip to a data transmission standard storage unit of the central processing unit, wherein the data transmission standard storage unit comprises a controlled switch communicating the central processing unit with the bridge chip, and a data-offering unit coupled to the controlled switch via a control end;
    processing the first signal into a second signal by the data transmission standard storage unit of the central processing unit and transmitting the second signal back to the bridge chip, wherein the second signal is differentiated by selectively conducting or shutting off the controlled switch in response to a control signal provided by the data-offering unit so as to inform the bridge chip of an operable transmission standard of the central processing unit in response to the first signal; and exiting the coordinating state of the computer system, and performing data transmission between the central processing unit and the bridge chip with the operable transmission standard.

14. A data transmission coordinating system, comprising:

a central processing unit issuing a first signal after entering a coordinating state;

a bridge chip including a first data transmission standard storage unit that receives and processes the first signal into a second signal and outputs the second signal to inform the central processing unit of a first operable transmission standard of the bridge chip; and a bus conducting data transmission between the central processing unit and the bridge chip under a commonly operable transmission standard determined according to the first operable transmission standard;

wherein the first data transmission standard storage unit comprises:

a controlled switch having a first terminal and a second terminal coupled to the bus for receiving the first signal and outputting the second signal, respectively; and a data-offering unit coupled to the controlled switch via a control end for providing a control signal to selectively conduct or shut off the controlled switch so as to differentiate the second signal, thereby informing the central processing unit of the first operable transmission standard of the bridge chip.

15. The data transmission coordinating system according to claim 14 wherein the central processing unit comprises a second data transmission standard storage unit that receives and processes a third signal from the bridge chip into a fourth signal and outputs the fourth signal to inform the bridge chip of a second operable transmission standard of the central processing unit after the coordinating state is entered, and the commonly operable transmission standard is determined according to the first operable transmission standard and second operable transmission standard.

16. The data transmission coordinating system according to claim 15 wherein the second data transmission standard storage unit comprises:

a controlled switch having a first terminal and a second terminal coupled to the bus for receiving the third signal and outputting the fourth signal, respectively; and a data-offering unit coupled to the controlled switch via a control end for providing a control signal to selectively conduct or shut down the controlled switch so as to differentiate the fourth signal, thereby informing the bridge chip of the second operable transmission standard of the central processing unit.

17. The data transmission coordinating system according to claim 16 wherein the data-offering unit is a NOR gate outputting the control signal in a logic high state or a logic low state according to a first logic input representing the second operable transmission standard of the bridge chip, a second logic input indicating whether the coordinating state is entered or not, and a true table.

18. The data transmission coordinating system according to claim 14 wherein the data-offering unit is a NOR gate outputting the control signal in a logic high state or a logic low state according to a first logic input representing the first operable transmission standard of the bridge chip, a second logic input indicating whether the coordinating state is entered or not, and a true table.

19. The data transmission coordinating system according to claim 14 wherein the bus is a front side bus.

* * * * *